(12) United States Patent
Umemoto et al.

(10) Patent No.: US 6,795,136 B2
(45) Date of Patent: Sep. 21, 2004

(54) LIQUID-CRYSTAL DISPLAY DEVICE

(75) Inventors: Seiji Umemoto, Osaka (JP); Toshihiko Ariyoshi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 47 days.

(21) Appl. No.: 09/738,979

(22) Filed: Dec. 20, 2000

(65) Prior Publication Data

US 2001/0004275 A1 Jun. 21, 2001

(30) Foreign Application Priority Data

Dec. 20, 1999 (JP) .......................................... 11-361236

(51) Int. Cl.$^7$ .......................................... G02F 1/1335
(52) U.S. Cl. .......................................... 349/61; 349/62
(58) Field of Search .......................... 349/61–62, 64–66, 349/70; 362/31

(56) References Cited

U.S. PATENT DOCUMENTS

| | | | | |
|---|---|---|---|---|
| 4,549,819 A | * | 10/1985 | Muramoto et al. | ......... 374/178 |
| 4,626,074 A | * | 12/1986 | Crossland et al. | ............ 349/65 |
| 4,668,049 A | * | 5/1987 | Canter et al. | ................. 349/65 |
| 4,860,171 A | * | 8/1989 | Kojima | ........................ 362/31 |
| 5,046,826 A | * | 9/1991 | Iwamoto et al. | .............. 349/65 |
| 5,099,343 A | * | 3/1992 | Margerum et al. | ............ 349/63 |
| 5,410,454 A | * | 4/1995 | Murase et al. | ................ 362/31 |
| 5,537,233 A | * | 7/1996 | Miura et al. | ................... 349/61 |
| 5,712,694 A | * | 1/1998 | Taira et al. | ...................... 349/9 |
| 5,764,315 A | * | 6/1998 | Yokota et al. | ................. 349/62 |
| 5,825,440 A | * | 10/1998 | Kim | ............................. 349/61 |
| 6,011,602 A | * | 1/2000 | Miyashita et al. | ............. 349/65 |
| 6,137,554 A | * | 10/2000 | Nakamura | .................... 349/75 |
| 6,147,725 A | * | 11/2000 | Yuuki et al. | ................... 349/65 |
| 6,285,420 B1 | * | 9/2001 | Mizumo et al. | .............. 349/65 |
| 6,322,225 B1 | * | 11/2001 | Koike | .......................... 362/31 |

FOREIGN PATENT DOCUMENTS

| | | | |
|---|---|---|---|
| EP | 0 913 721 A | 5/1999 | |
| EP | 0 957 392 A | 11/1999 | |
| JP | 5-158033 | 6/1993 | ......... G02F/1/1335 |
| JP | 08 094844 a | 8/1996 | |
| JP | 2000-147499 | 5/2000 | ......... G02F/1/1335 |

OTHER PUBLICATIONS

Patent Abstract of Japan 05–158033 Jun. 25, 1993.
Patent Abstract of Japan 2000–147499 May 26, 2000.
TAI C.Y. et al., "A Transparent Frontlighting System for Reflective–Type Displays", 1995 SID International Symposium Digest of Technical Papers. Orlando. May 23–25, 1995. SID International Symposium Digest of Technical Papers, Santa Ana. SID. U.S. vol. 26, May 23, 1995, pp. 375–378, XP000657155.

\* cited by examiner

*Primary Examiner*—Dung T. Nguyen
*Assistant Examiner*—T L Rude
(74) *Attorney, Agent, or Firm*—Sughrue Mion, PLLC

(57) ABSTRACT

There is provided a liquid-crystal display device having a transmission type liquid-crystal display panel including a liquid-crystal cell, a light source disposed on at least one side surface of the liquid-crystal display panel, and an optical path changing sheet disposed on a back side opposite to a visual side of the liquid-crystal display panel and having optical path changing slopes. Incident light from the light source is reflected toward the visual side of the liquid-crystal display device.

19 Claims, 3 Drawing Sheets

LIQUID-CRYSTAL DISPLAY DEVICE

BACKGROUND OF THE INVENTION

1. Field of the Invention

The present invention relates to a transmission type or transmission-reflection double type liquid crystal display device which can be reduced in thickness and weight easily and which is excellent in display quality.

The present application is based on Japanese Patent Application No. Hei. 11-361236, which is incorporated herein by reference.

2. Description of the Related Art

Greater reduction in thickness and weight of transmission type liquid-crystal display devices has been demanded for purposes of suppression of increase in weight with the advance of increase in size of television and personal computer display screens, reduction in size and weight of portable personal computers and portable telephone sets, etc. In the meanwhile, it is difficult to reduce thickness and weight of a transmission type liquid-crystal display device provided with a back-lighting system using a background-art bottom type or side-lighting type light pipe. Incidentally, the bottom-type back-lighting system generally has a thickness of not smaller than 4 mm because a light source, a light diffusing plate and a reflector are disposed just under a liquid-crystal display panel. Even the side-lighting type light pipe has a thickness of not smaller than 1 mm under the necessity of light transmission. When a light diffusing plate, a reflector, a prism sheet, etc. are disposed on the side-lighting type light pipe, the total thickness generally reaches a value of not smaller than 3 mm.

SUMMARY OF THE INVENTION

An object of the present invention is to develop a transmission type or transmission-reflection double type liquid-crystal display device which can be reduced in thickness and weight easily and which is excellent in display quality.

According to the present invention, there is provided a liquid-crystal display device comprising: a transmission type liquid-crystal panel including a liquid-crystal cell; a light source disposed on at least one side surface of the liquid-crystal display panel; and an optical path changing sheet disposed on a back side opposite to a visual side of the liquid-crystal display panel and provided with optical path changing slopes by which incident light from the light source is reflected toward the visual side of the liquid-crystal display device.

According to the present invention, while incident light from a light source disposed on a side surface of a liquid-crystal display panel by use of liquid-crystal cell substrates is transmitted backward efficiently, the optical path of the transmission light is changed efficiently toward the visual side of the panel through an optical path changing sheet disposed on the back of the panel. Hence, the transmission light can be utilized for liquid-crystal display. A back-lighting system can be formed by the optical path changing sheet excellent in thickness, and formed by arrangement of a light source on its side surface. A transmission type liquid-crystal display device which is excellent in thickness and weight and which is bright and excellent in display quality can be formed. When a reflection layer is disposed on the back surface of the optical path changing sheet, a transmission-reflection double type liquid-crystal display device can be formed easily.

The above description is based on use of a slope reflection type optical path changing sheet. That is, light incident on a side surface or transmission light thereof is reflected by slopes so that the optical path of the light can be changed with good directivity. In a method of scatter reflection by a rough surface as described in JP-A-5-158033, it is difficult to achieve the aforementioned effect. Incidentally, JP-A-5-158033 teaches a reflection type liquid-crystal display device in which illumination light is made incident on a side surface of a liquid-crystal display panel and totally reflected by a visual side cell substrate and in which the reflected light is scattered by a rough surface type reflector so that the scattered light is utilized for display.

In the aforementioned case, however, the light allowed to be utilized for display is the light that emits from the panel because the light comes out of the total reflection condition by scattering. Generally, scattered light exhibits a normal distribution having a direction of positive reflection as a peak. Hence, the aforementioned display light is the light which is hardly utilized efficiently for display greatly inclined with respect to a frontal (vertical) direction. Hence, the display becomes dark in the frontal direction. Nevertheless, intensifying scattering through the rough surface type reflector is unfavorable for display in consideration of viewing in a reflection mode because the quantity of light in the frontal direction is reduced. It is, therefore, necessary to adjust scattering intensity to keep balance between both transmission and reflection modes in such a rough surface type reflection method. It is, however, difficult to obtain scattering intensity favorable to the two modes because the two modes are antinomic to each other.

On the other hand, the slope reflection type optical path changing sheet according to the present invention mainly utilizes light exhibiting a peak in the direction of positive reflection and controls the optical path of the reflected light. Hence, directivity favorable for display, particularly frontal directivity, can be provided easily. Hence, a bright transmission mode can be achieved. Also in a reflection mode, flat portions of the optical path changing sheet except the slopes can be utilized. Hence, the state of light can be balanced easily so as to be favorable to both transmission and reflection modes.

Features and advantages of the invention will be evident from the following detailed description of the preferred embodiments described in conjunction with the attached drawings.

DETAILED DESCRIPTION OF THE PREFERRED EMBODIMENTS

Figure 1:
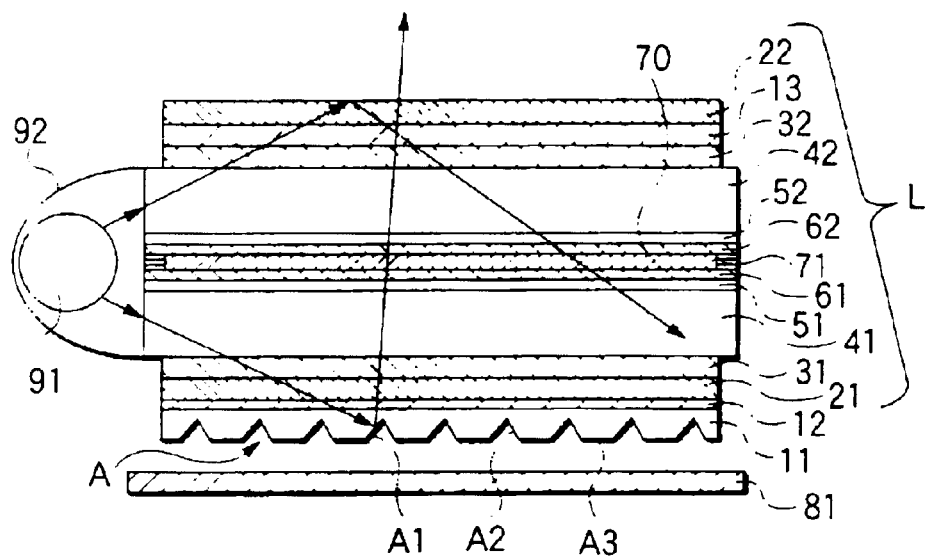
FIG. 1 is an explanatory sectional view showing an example of a transmission type (transmission-reflection double type) liquid-crystal display device.
Figure 2:
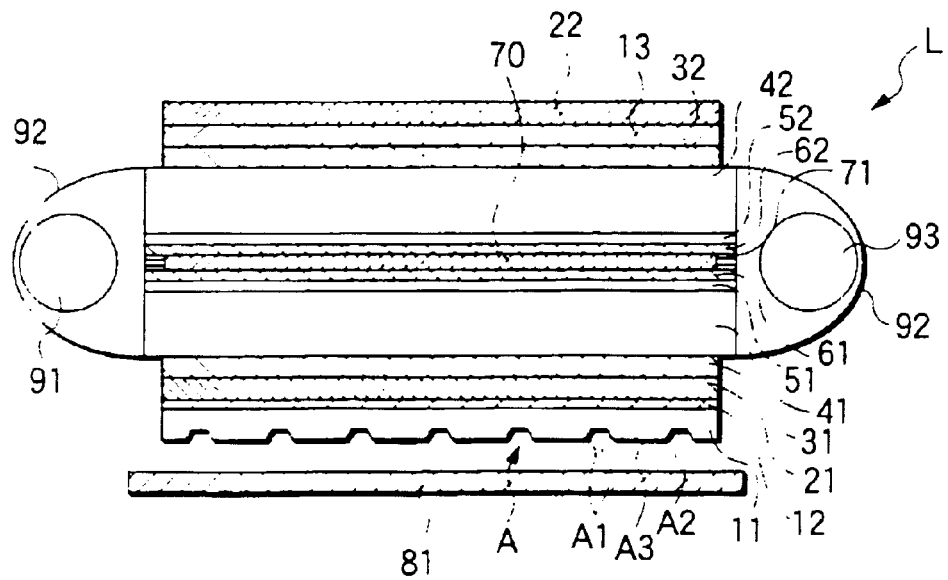
FIG. 2 is an explanatory sectional view showing another example of the transmission type (transmission-reflection double type) liquid-crystal display device.

The liquid-crystal display device according to the present invention comprises: a transmission type liquid-crystal panel including a liquid-crystal cell; a light source disposed on at least one side surface of the liquid-crystal display panel; and an optical path changing sheet disposed on a back side opposite to a visual side of the liquid-crystal display panel and provided with optical path changing slopes by which incident light from the light source is reflected toward the visual side of the liquid-crystal display device. FIGS. 1 and 2 show examples of the liquid-crystal display device. In FIGS. 1 and 2, L designates a liquid-crystal display panel; 11, an optical path changing sheet; A1, optical path changing slopes; and 91 and 93, light sources.

A suitable transmission type display panel at least having a liquid-crystal cell can be used as the liquid-crystal display panel L. That is, as shown in FIGS. 1 and 2, it is possible to use, as the liquid-crystal display panel L, a display panel which at least has a liquid-crystal cell having liquid crystal 70 enclosed between cell substrates 41 and 42 through a sealing material 71 so that incident light from the arrangement side of the optical path changing sheet 11 is made to go out as display light from the other side under control by the liquid crystal, or the like. The liquid-crystal display panel is not particularly limited in kind.

Incidentally, specific examples of the liquid-crystal cell include, on the basis of the format of alignment of liquid crystal, a TN liquid-crystal cell, an STN liquid-crystal cell, a perpendicularly aligned cell, an HAN cell, a twisted or non-twisted cell such as an OCB cell, a guest-host liquid-crystal cell, or a ferroelectric liquid-crystal cell, etc. Further, a suitable drive method such as an active matrix method, a passive matrix method, or the like, may be used as the method for driving liquid crystal. As shown in FIGS. 1 and 2, the liquid crystal is generally driven through transparent electrodes 51 and 52 provided on the inner side of the pair of cell substrates 41 and 42.

A suitable transparent substrate such as a glass substrate or a resin substrate can be used as each of the cell substrates. Especially, a substrate made of an optically isotropic material is preferably used from the point of view of display quality, or the like. A substrate such as a non-alkali glass plate exhibiting excellent colorlessness and transparency with respect to a blue glass plate is preferably used from the point of view of improvement of luminance and display quality. A resin substrate is preferably used from the point of view of reduction in weight, or the like. The thickness of the cell substrate can be determined suitably in accordance with enclosing strength of liquid crystal, or the like, without any particular limitation. The thickness of the cell substrate is generally selected to be in a range of from 10 μm to 5 mm, particularly in a range of from 50 μm to 2 mm, more particularly in a range of from 100 μm to 1 mm, from the point of view of balance between light transmission efficiency and reduction in thickness and weight.

For the formation of the liquid-crystal cell, one suitable functional layer or two or more suitable functional layers may be provided as occasion demands. Examples of such functional layer include an aligned film made of a rubbed film for aligning the liquid crystal, a color filter for color display, and so on. Incidentally, aligned films 61 and 62 are generally formed on transparent electrodes 51 and 52 as shown in FIGS. 1 and 2. A color filter not shown is generally provided between one of the cell substrates 41 and 42 and corresponding one of the transparent electrodes 51 and 52.

The liquid-crystal display panel may contain one suitable optical layer or two or more suitable optical layers such as polarizers 21 and 22, retarders 31 and 32, a light diffusing layer 13, etc. added to the liquid-crystal cell as shown in FIGS. 1 and 2. The polarizers are provided for achievement of display using linearly polarized light. The retarders are provided for improvement of display quality by compensation for retardation due to birefringence of liquid crystal. The light diffusing layer is provided for enlargement of a display range due to diffusion of display light, uniformity of luminance due to leveling of emission-line-like light emission through slopes of the optical path changing sheet, increase of the quantity of light incident on the optical path changing sheet due to diffusion of transmission light in the liquid-crystal display panel, etc.

A suitable material can be used as each of the polarizers without any particular limitation. From the point of view of obtaining good-contrast-ratio display due to incidence of high-grade linearly polarized light, etc., for example, an absorption type polarizing film made of a drawn film having a dichromatic material such as iodine or dichromatic dye adsorbed on a hydrophilic macromolecular film such as a polyvinyl alcohol film, a partially formalized polyvinyl alcohol film or a partially saponified ethylene-vinyl acetate copolymer film may be preferably used. Or a film high in the degree of polarization such as the absorption type polarizing film having a transparent protective layer provided on one or each side of the absorption type polarizing film may be preferably used.

A material excellent in transparency, mechanical strength, thermal stability, moisture shielding characteristic, etc. is preferably used for the formation of the transparent protective layer. Examples of the material include: polymers such as acetate resin, polyester resin, polyether-sulfone resin, polycarbonate resin, polyamide resin, polyimide resin, polyolefin resin, acrylic resin, polyether resin, polyvinyl chloride resin, polystyrene resin and norbornene resin; heat-curable or ultraviolet-curable resins such as acrylic resin, urethane resin, acrylic urethane resin, epoxy resin, silicone resin, etc.; and so on. The transparent protective layer may be bonded as a film by a bonding method or may be applied as polymer liquid by a coating method.

The polarizers to be used, particularly the visual side polarizer, may be subjected to non-glare treatment or anti-reflection treatment for preventing viewing from being disturbed by surface reflection of external light. Non-glare treatment can be made by forming a surface as a structure of fine unevenness. In the non-glare treatment, various methods may be used for forming a surface as a structure of fine unevenness Examples of the methods include: a surface roughening method such as a sandblasting method, an embossing method, etc.; a method of mixing transparent particles such as silica particles; and so on. Anti-reflection treatment may be made by a method of forming an interference vapor deposition film, or the like. Alternatively, non-glare treatment or anti-reflection treatment can be made by a method of bonding a film having such a surface structure of fine unevenness or an interference film, as described above. Incidentally, two polarizers may be provided on both sides of the liquid-crystal cell as shown in FIGS. 1 and 2 or one polarizer may be provided on one side of the liquid-crystal cell.

On the other hand, each of the retarders may be formed of a suitable material. Examples of the material include a birefringence film obtained by stretching a film of a suitable polymer, for example, as shown in the description of the transparent protective layer by a suitable method such as uni-axial stretching, bi-axial stretching, or the like; an aligned film of a suitable liquid-crystal polymer such as a nematic liquid-crystal polymer or a discotic liquid-crystal polymer; and an aligned layer of the aligned film supported by a transparent substrate. A material having a refractive index controlled in a direction of thickness under the operation of heat shrinkage force of a heat-shrinkable film may be also used.

The compensatory retarders 31 and 32 shown in FIGS. 1 and 2 are generally disposed between the visual side polarizer 21 and the liquid-crystal cell and/or between the back side polarizer 22 and the liquid-crystal cell as occasion demands. A suitable material can be used as each of the retarder accordance with the wavelength range, etc. Each of the retarders in plates may be formed of a laminate of two or more layers in order to control optical characteristic such as retardation, etc.

The light diffusing layer can be provided by a suitable method using a coating layer, a diffusing sheet, or the like, having a surface fine structure similar to that of the non-glare layer. The light diffusing layer 13 shown in FIGS. 1 and 2 is formed of an adhesive layer containing transparent particles. The light diffusing layer 13 serves also as a layer for bonding the polarizer 22 and the retarder 32 to each other, so that reduction in thickness is achieved. A suitable adhesive agent can be used for the formation of the adhesive layer. The adhesive agent contains, as a base polymer, a suitable polymer such as a rubber polymer, an acrylic polymer, a vinyl-alkyl-ether polymer, a silicone polymer, a polyester polymer, a polyurethane polymer, a polyether polymer, a polyamide polymer, a styrene polymer, etc.

Especially, an adhesive agent excellent in transparency, weather resistance, heat resistance, etc. such as an adhesive agent containing, as a base polymer, a polymer mainly containing alkyl ester of acrylic acid or methacrylic acid is used preferably. As the transparent particles to be mixed in the adhesive layer, there can be used one or two members suitably selected from the group consisting of, for example, inorganic particles of silica, alumina, titania, zirconia, tin oxide, indium oxide, cadmium oxide, antimony oxide, or the like, which has a mean particle size in a range of from 0.5 to 20 $\mu$m and which may be electrically conductive, and organic particles of a crosslinked or non-crosslinked polymer, or the like.

The light sources disposed on side surfaces of the liquid-crystal display panel are provided so that light to be utilized as light for illuminating the liquid-crystal display device is made to enter the side surfaces of the liquid-crystal display panel. Hence, reduction in thickness and weight of the liquid-crystal display device can be achieved when the light sources are used in combination with the optical path changing sheet disposed on the back of the panel. A suitable light source can be used as each of the light sources. Examples of the light source preferably used include a linear light source such as a (cold or hot) cathode tube, a point light source such as a light-emitting diode, an array of point light sources arranged in line or plane, and a combination of a point light source and a linear light pipe for converting incident light from the point light source into light of a linear light source through the linear light pipe.

One light source 91 may be disposed on one side surface of the liquid-crystal display panel L as shown in FIG. 1 or light sources 91 and 93 may be disposed on two or more side surfaces of the liquid-crystal display panel L as shown in FIG. 2. When light sources are disposed on a plurality of side surfaces, the plurality of side surfaces may be provided as a combination of side surfaces opposite to each other as shown in FIG. 2 or may be provided as a combination of side surfaces vertically crossing each other. Further, the plurality of side surfaces may be provided as a combination of three or more side surfaces by use of the aforementioned combinations at once.

The light sources make it possible to view the liquid-crystal display device in a transmission mode in which the light source is switched on. In the case where the liquid-crystal display device is provided as a transmission-reflection double type liquid-crystal display device, the light source can be switched on/off because it is unnecessary to switch on the light source when the display device is viewed in a reflection mode due to external light. Any optional method may be used for switching on/off the light source. That is, any one of background-art methods may be used. Incidentally, the light source may be of a multicolor light emission type in which the color of emitted light can be changed. Or different types of light sources may be provided so that multicolor light emission can be made by the different types of light sources.

As shown in FIGS. 1 and 2, each of the light sources 91 and 93 may be used in combination with a suitable assisting means such as a reflector 92 for enclosing the light source to lead scattered light to a side surface of the liquid-crystal display panel L as occasion demands. A suitable reflection sheet such as a resin sheet provided with a high-reflectance metal thin film, a white sheet, a sheet of metal foil, etc. can be used as the reflector. The reflector may be used as a fixing means serving also as means for enclosing the light source by a method of bonding an end portion of the reflector to an end portion of the cell substrate of the liquid-crystal display panel.

The optical path changing sheet is disposed on the back side (opposite to the visual side) of the liquid-crystal display panel so that the optical path of incident light or transmission light from the light source 91 disposed on the liquid-crystal display panel L as represented by the arrow in FIG. 1 is changed in the visual side of the panel to be used as illumination light (display light). For this purpose, the optical path changing sheet 11 is provided with slopes A1 as shown in FIGS. 1 and 2. The slopes A1 reflect light, which is incident from the light sources 91 and 93, in a predetermined direction to thereby change the optical path of the light.

The optical path changing sheet may be formed as a suitable sheet having optical path changing slopes exhibiting reflecting characteristic as described above. From the point of view of obtaining illumination light excellent in frontal directivity through optical path change, it is preferable that an optical path changing sheet having optical path changing means A each of which contains optical path changing slopes A1 facing a side surface on which the light source is arranged, that is, facing an incidence side surface. Especially, it is preferable that an optical path changing sheet has optical path changing means A each of which contains optical path changing slopes A1 constituted by prismatic structures.

Figure 3A:
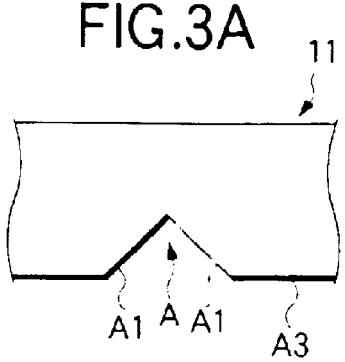
FIGS. 3(A), 3(B), 3(C), 3(D) and 3(E) are explanatory side views showing an optical path changing means in an optical path changing sheet.
Figure 3B:
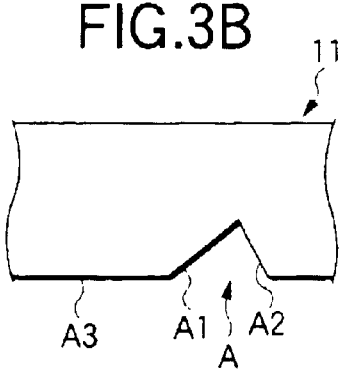
Figure 3C:
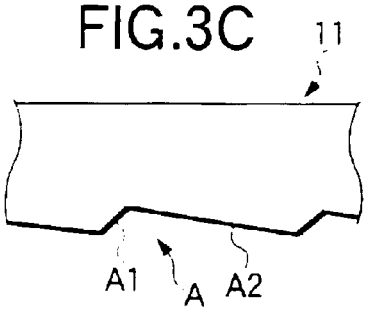
Figure 3D:
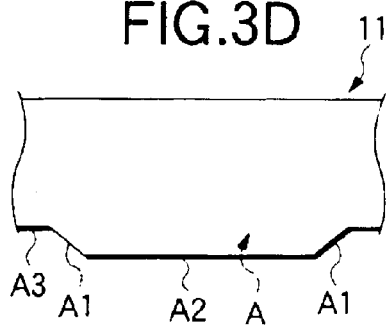
Figure 3E:
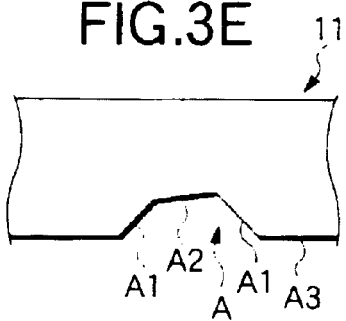

FIGS. 3A to 3E show examples of only one optical path changing means constituted by optical path changing slopes or prismatic structures as described above. In FIGS. 3A to 3C, each of the optical path changing means A is shaped substantially like a triangle in section. In FIGS. 3D and 3E, each of the optical path changing means A is shaped substantially like a trapezoid in section. In FIG. 3A, each of the optical path changing means A has optical path changing slopes A1 so as to be an isosceles triangle. In FIG. 3B, each of the optical path changing means A has an optical path changing slope A1, and a steep slope A2 having an inclination angle larger than that of the slope A1 with respect to a sheet plane. In FIG. 3C, each of the optical path changing sheet is provided as a repetitive structure of a plurality of optical path changing means A each constituted by an optical path changing slope A1 and a gentle slope A2 having an inclination angle smaller than that of the slope A1 with respect to the sheet plane. In FIG. 3C, a plurality of optical path changing means A are formed on the whole surface of one side of the sheet so that the means A are adjacently continued to one another. In FIG. 3D, each of the optical path changing means A is constituted by a convex portion (protrusion). In FIG. 3E, each of the optical path changing means A is constituted by a concave portion (groove).

Hence, as described above, the optical path changing means may be formed of concave or convex portions constituted by equal-side surfaces or slopes having equal inclination angles. Alternatively, the optical path changing means may be formed of concave or convex portions constituted by a combination of optical path changing slopes and steep or gentle slopes or slopes different in inclination angle. The shape of each slope can be determined suitably in accordance with the number of incidence side surfaces and the position of each incidence side surface. From the point of view of improving mar-proofness to keep the slopes function high, optical path changing means constituted by concave portions is favorable to optical path changing means constituted by convex portions because the former has slopes hardly damaged, etc.

The optical path changing sheet preferable from the point of view of achieving the aforementioned characteristic such as frontal directivity has optical path changing slopes A1 facing the incidence side surface and inclined at an inclination angle in a range of from 35 to 48 degrees with respect to the sheet plane as shown in the drawings. Hence, when light sources are disposed on two or more side surfaces of the liquid-crystal display panel and two or more incidence surfaces are provided, an optical path changing sheet having optical path changing slopes A1 in accordance with the number and positions of the incidence side surfaces is used preferably.

Incidentally, when light sources 91 and 93 are disposed on two opposite side surfaces of the liquid-crystal display panel L as shown in FIG. 2, there is preferably used an optical path changing sheet 11 constituted by a plurality of optical path changing means A each having two optical path changing slopes A1 so as to form like an isosceles triangle in section as shown in FIG. 3A, or constituted by a plurality of optical path changing means A each having two optical path changing slopes A1 so as to form like a trapezoid in section as shown in FIGS. 3D and 3E so that the ridgelines of the optical path changing sheet 11 each shaped by the two optical changing slopes A1 are parallel to the incidence side surfaces respectively. When light sources are disposed on two adjacent vertically crossing side surfaces of the liquid-crystal display panel, there is preferably used an optical path changing sheet having two optical path changing slopes A1 facing the side surfaces respectively so that the ridgelines of the two optical path changing slopes A1 are parallel to the two crossing side surfaces respectively. When light sources are disposed on three or more side surfaces inclusive of opposite side surfaces and adjacent cross side surfaces, there is preferably used an optical path changing sheet having optical path changing slopes A1 constituted by a combination of the aforementioned slopes.

The aforementioned optical path changing slopes A1 have a role of reflecting light incident on the slopes A1 among light incident on the incidence side surface from the light source or transmission light thereof and changing the optical path to thereby supply the reflected light to the visual side of the liquid-crystal display device. In this case, when the inclination angle of each of the optical path changing slopes A1 with respect to the sheet plane is selected to be in a range of from 35 to 48 degrees, the optical path of light incident on the side surface or transmission light there of can be changed so as to be sufficiently perpendicular to the sheet plane as illustrated with polygonal lines and arrows in FIG. 1 so that illumination light excellent in frontal directivity can be obtained efficiently. If the inclination angle is smaller than 35 degrees, the optical path of reflected light is displaced largely from the frontal direction so that frontal luminance may run short because it is difficult to utilize the reflected light efficiently. If the inclination angle is larger than 48 degrees, the condition for total reflection of light incident on the side surface or transmission light thereof cannot be satisfied so that efficiency of utilization of light incident on the side surface may run short because light leaking from the optical path changing slopes increases.

From the point of view of optical path change excellent in frontal directivity, suppression of leaking light, etc., the preferable inclination angle of each of the optical path changing slopes A1 is in a range of from 38 to 46 degrees, particularly in a range of from 40 to 44 degrees in consideration of the condition for total reflection of light transmitted in the liquid-crystal display panel on the basis of Snell's law of refraction. Incidentally, the condition for total reflection by a glass plate is generally 42 degrees. In this case, light incident on the side surface is made incident on the optical path changing slopes while transmitted in a state in which the light is condensed in a rage of ±42 degrees.

Figure 4:
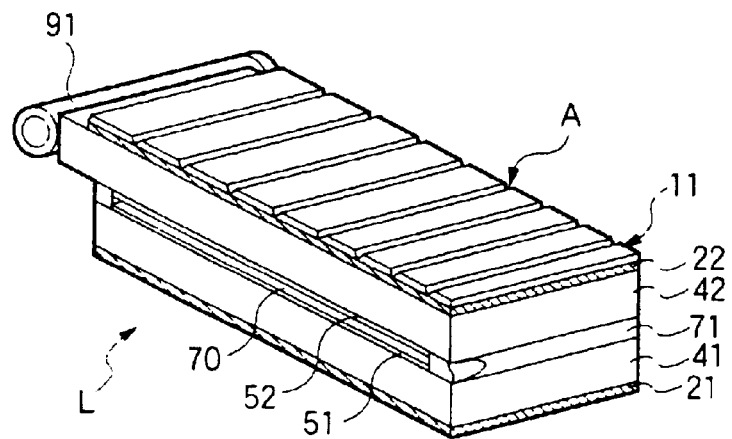
FIG. 4 is an explanatory perspective view showing a further example of the transmission type liquid-crystal display device.
Figure 5:
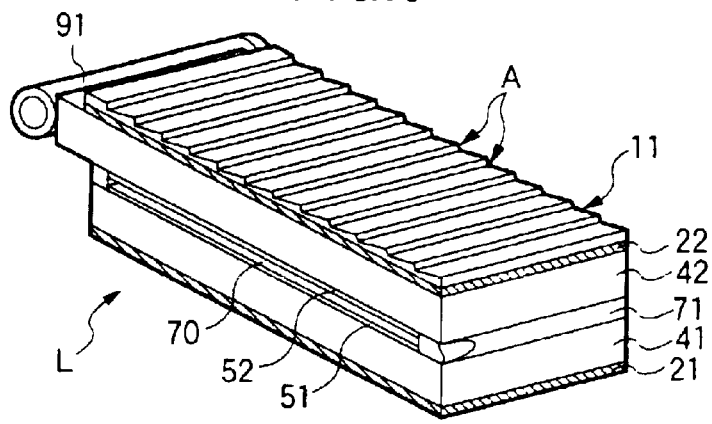
FIG. 5 is an explanatory perspective view showing a further example of the transmission type liquid-crystal display device.
Figure 6:
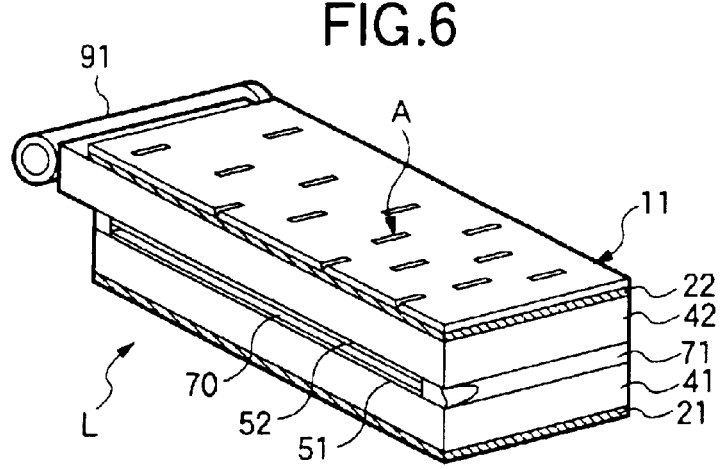
FIG. 6 is an explanatory side view showing an example of the optical path changing sheet.

A plurality of the optical path changing means A having the optical path changing slopes A1 are generally formed as a repetitive structure as shown in FIGS. 4, 5 and 6 for the purpose of reducing the thickness of the optical path changing sheet. In this case, from the point of view of reflecting back light incident on the incidence side surface and transmitting the reflected light toward the counter side surface efficiently to thereby emit light on the whole surface of the liquid-crystal display as uniformly as possible, it is preferable that a plurality of optical path changing means A are formed as a structure including gentle slopes A2 inclined at an inclination angle of not larger than 10 degrees, particularly not larger than 5 degrees, more particularly not larger than 3 degrees with respect to the sheet plane, and flat surfaces A3 inclined at an inclination angle of about 0 degrees with respect to the sheet plane as shown in FIGS. 3a to 3e. Therefore, the optical path changing means A including a steep slope A2 shown in FIG. 3b is preferably formed as a structure in which the angle of the steep slopes is selected to be not smaller than 35 degrees, particularly not smaller than 50 degrees, more particularly not smaller than 60 degrees so that a flat surface A3 can be widened.

When a reflection layer 81 is disposed on the back of the optical path changing sheet 11 as shown in FIGS. 1 and 2, a gentle slope A2 or a flat surface A3 can function as a portion on which external light is made incident and through which reflected light of the incident light by the reflection layer 81 is transmitted. Hence, display can be made in a reflection mode using external light when the light source is switched off. Hence, a transmission-reflection double type liquid-crystal display device can be formed.

In the aforementioned case, when a plurality of optical path changing means A are formed as a repetitive structure of adjacent optical path changing means A each having slopes A1 and A2 as shown in FIG. 3B, it is preferable that the angle difference among inclination angles of the slopes A2 with respect to the sheet plane is selected to be not larger than 5 degrees, particularly not larger than 4 degrees, more particularly not larger than 3 degrees on the whole of the optical path changing sheet, and that the difference between inclination angles of adjacent gentle slopes is selected to be not larger than 1 degree, particularly not larger than 0.3 degrees, more particularly not larger than 0.1 degrees. This is for the purpose of preventing the optimum viewing direction of the liquid-crystal display device, especially the optimum viewing direction in a direction near the frontal direction from changing widely by the reflection by the gentle slopes A2, particularly from changing widely in between adjacent gentle slopes. From the point of view of obtaining bright display in an external light mode, it is preferable that the projected area of each of the gentle slopes A2 on the sheet plane is selected to be not smaller than 5 times, particularly 10 times, more particularly 15 times as large as the projected area of each of the optical path changing slopes A1 on the sheet plane. This is for the purpose of improving efficiency of incidence of external light and transmittance of light reflected by the reflection layer.

As shown in FIGS. 4 to 6, the optical path changing means A is provided so that the ridgelines of the optical path changing means A are parallel to or inclined to the incidence side surface of the liquid-crystal display panel L on which the light source 91 is disposed. In this case, the optical path changing means A may be formed so as to be continued from one end to the other end of the optical path changing sheet as shown in FIGS. 4 and 5 or may be formed intermittently and discontinuously as shown in FIG. 6. When the optical path changing means A is formed discontinuously, it is preferable from efficiency of incidence of transmission light, efficiency of changing the optical path, etc. that the length of each concave or convex made of a groove or a protrusion in a direction of the incidence side surface is selected to be not smaller than 5 times as large as the depth or height thereof. It is further preferable from the point of view of uniform light emission on the display screen of the panel that the length is selected to be not larger than 500 µm, particularly in a range of from 10 to 480 µm, more particularly in a range of from 50 to 450 µm.

The sectional shape of the optical path changing means A and the repetition pitch of the optical path changing slopes A1 are not particularly limited. They can be determined suitably in accordance with the uniformity of light emission on the display screen of the panel in a transmission (switching-on) mode because the optical path changing slopes A1 are factors for determining luminance. They can be further determined suitably in accordance with the uniformity of light emission on the display screen of the panel in an external light mode in a transmission-reflection double type liquid-crystal display device. Hence, the quantity of light which optical path is changed can be controlled on the basis of the distribution density thereof.

Figure 7:
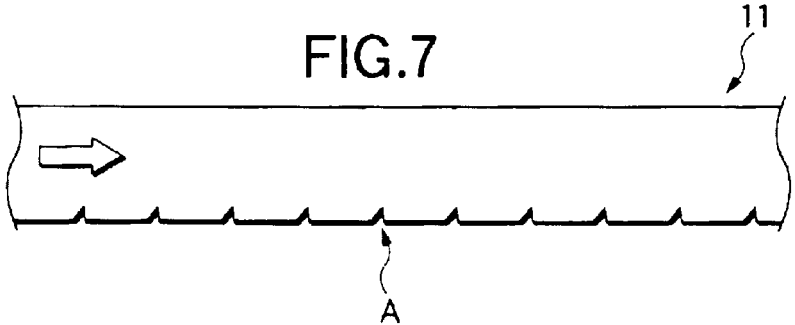
FIG. 7 is an explanatory side view showing an example of the optical path changing sheet.
Figure 8:
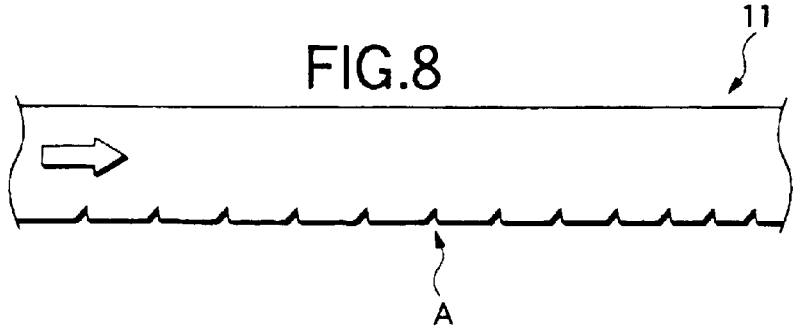
FIG. 8 is an explanatory side view showing another example of the optical path changing sheet.

Therefore, the inclination angles of the slopes A1 or A2 may be uniform on the whole surface of the sheet or may be changed so that the optical path changing means A is enlarged as the optical path changing means goes farther from the incidence side surface as shown in FIG. 7 for the purpose of making light emission on the display screen of the panel uniform against absorption loss and attenuation of transmission light due to the optical path changing. The optical path changing means A may be disposed at regular intervals of a predetermined pitch as shown in FIG. 7. Alternatively, the optical path changing means A maybe disposed at irregular intervals so that the pitch is narrowed as the optical path changing means A goes father from the incidence side surface to thereby make the distribution density of the optical path changing means A high as shown in FIG. 8. Alternatively, the pitch may be provided as a random pitch so that light emission on the display screen of the panel can be made uniform. In FIGS. 7 and 8, the arrow shows the direction of transmission of light incident on the incidence side surface.

Incidentally, when a transmission-reflection double type liquid-crystal display device is provided, unnatural display may be caused by shortage of transmission of display light if the optical path changing slopes A1 overlap pixels of the liquid-crystal cell. It is preferable from the point of view of preventing the unnatural display that the overlap area is reduced as sufficiently as possible to thereby keep sufficient light transmittance through the gentle slopes A2 or the flat surfaces A3. In consideration that the pixel pitch of the liquid-crystal cell is generally in a range of from 100 to 300 µm, it is preferable from this point of view that each of the optical path changing slopes A1 is selected to be not larger than 40 µm, particularly in a range of from 3 to 20 µm, more particularly in a range of from 5 to 15 µm in terms of the projected width thereof on the sheet plane. The projected width is also preferable from the point of view of preventing display quality from being lowered because of diffraction in consideration that the coherent length of a fluorescent tube is generally about 20 µm.

It is preferable from the aforementioned point of view that the distance between adjacent ones of the optical path changing slopes A1 is large. As described above, however, the optical path changing slopes serve as a functional portion for substantially generating illumination light by changing the optical path of light incident on the side surface. Hence, if the distance is too large, illumination at the time of lighting becomes so sparse that display may be unnatural. In consideration of these, the repetition pitch of the optical path changing slopes A1 is preferably selected to be not larger than 5 mm, particularly in a range of from 20 µm to 3 mm, more particularly in a range of from 50 µm to 2 mm.

When the optical path changing means is constituted by a repetitive prismatic structures, moire may occur because of interference between the optical path changing means and the pixels of the liquid-crystal cell. Although prevention of moire can be made by adjustment of the pitch of the repetitive prismatic structures, the pitch of the prismatic structures is limited to the aforementioned preferable range. Hence, measures against the case where moire occurs though the pitch is in the aforementioned range become a question. In the present invention, a method in which the ridgelines of the prismatic structures are formed to be inclined with respect to the incidence side surface so that the repetitive prismatic structures may be arranged to cross the pixels to thereby prevent moire is used preferably. On this occasion, if the inclination angle to the incidence side surface is too large, deflection occurs in reflection by the optical path changing slopes A1. As a result, large deviation occurs in the direction of changing of the optical path. This is apt to cause lowering of display quality. It is, therefore, preferable that the inclination angle of the ridgelines to the incidence side surface is selected to be in a range of ±30 degrees, particularly in a range of ±25 degrees. Incidentally, the symbol "±" means the direction of inclination of the ridgelines with the incidence side surface as a reference. If the resolution of the liquid-crystal cell is so low that moire never occurs or if moire is negligible, it is preferable that the ridgelines are arranged to be as parallel with the incidence side surface as possible.

The optical path changing sheet may be formed from a suitable material exhibiting transparency in accordance with the wavelength range of the light source. Incidentally, examples of the material to be used in a visible light range include polymers or curable resins as shown in the description of the transparent protective layer, and glass. An optical path changing sheet made from a material exhibiting no birefringence or little birefringence is used preferably. From the point of view of suppressing the quantity of loss of light enclosed in the inside of the panel by surface reflection so as not to be allowed to output to thereby efficiently supply light incident on the side surface or transmission light thereof to the optical path changing sheet, particularly to the optical path changing slopes A1, the optical path changing sheet is preferably obtained as an optical path changing sheet formed from a material in which the refractive index difference from the nearest liquid-crystal cell substrate is not larger than 0.15, particularly not larger than 0.10, more particularly not larger than 0.05 so that surface reflection is suppressed.

The optical path changing sheet maybe formed by a suitable method such as a cutting method. Examples of the production method preferable from the point of view of mass production include: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or by a solvent; a method in which a fluid resin polymerizable by heat, by ultraviolet rays or by radial rays is polymerized in the condition that the fluid resin is cast in a mold capable of forming a predetermined shape or the mold is filled with the fluid resin; and so on. The thickness of the optical path changing sheet can be determined suitably. From the point of view of reduction in thickness, the thickness of the optical path changing sheet is preferably selected to be not larger than 300 µm, particularly in a range of from 5 to 200 µm, more particularly in a range of from 10 to 100 µm. Incidentally, the optical path changing sheet may be also formed by a method of adding optical path changing means made of one kind of material or different kinds of materials to a resin sheet.

The optical path changing sheet is disposed on the back side opposite to the visual side of the liquid-crystal display panel. On this occasion, from the point of view of improvement of reflection efficiency by the optical path changing slopes A1 of the optical path changing means A and hence luminance due to effective utilization of light incident on the side surface, it is preferable, as shown in FIGS. 1 and 2 by way of examples, that the optical path changing sheet is arranged and bonded to the liquid-crystal display panel through the adhesive layer 12 while the slope-forming surface, that is, the surface in which the optical path changing means A is formed, is located on the outside (back side opposite to the visual side). From the point of view of efficiency of transmission light supply to the optical path changing slopes A1 on the basis of suppression of surface reflection in accordance with the optical path changing sheet, it is preferable that this bonding process is made by the adhesive layer in which the refractive index difference between the adhesive layer and the nearest liquid-crystal cell substrate is not larger than 0.2, particularly not larger than 0.15, more particularly not larger than 0.05. The adhesive layer 12 may be of a light diffusing type in accordance with the visual side adhesive layer 13.

As shown in FIGS. 1 and 2, a reflection layer 81 may be disposed on the outside, that is, the back side (opposite to the visual side) of the optical path changing sheet 11 as occasion demands. The reflection layer is provided for reflecting and inverting light leaking from the optical path changing sheet to thereby make the light incident on the optical path changing sheet again. As a result, improvement of light utilizing efficiency can be improved, so that a transmission-reflection double type liquid-crystal display device can be formed.

The reflection layer can be formed of a suitable material such as a white sheet in accordance with the background art. Particularly, examples of the reflection layer include: a coating layer containing powder of a high-reflectance metal such as aluminum, silver, gold, copper or chromium in a binder resin or power of an alloy of such a metal; a layer of a metal or dielectric multilayer thin film deposited by a suitable thin-film forming method such as a vapor deposition method, a sputtering method, or the like; a reflection sheet having the coating or deposited layer supported by a substrate made of a film, or the like; a reflection layer having high reflectance and made of a sheet of metal foil; and so on. The materials are particularly preferably used for forming a transmission-reflection double type liquid-crystal display device.

The reflection layer to be formed may exhibit a light diffusing function. The reflection layer has a diffuse reflection surface for diffusing reflected light to thereby attain improvement of frontal directivity. When the reflection layer is formed by a surface roughening process, the reflection layer can prevent the production of Newton rings due to adhesion to thereby improve visibility. Hence, the reflection layer maybe merely placed on the outside of the optical path changing sheet or may be stuck closely onto the optical path changing sheet by an adhering method, a vapor deposition method, or the like. When the reflection layer is stuck closely on to the slopes of the optical path changing means, the reflecting effect can be improved to thereby prevent leaking light almost perfectly and improve view angle characteristic and luminance more greatly.

The light diffusing type reflection layer can be formed by a method comprising the steps of: forming a surface of a film substrate as a fine irregularity structure by a suitable method such as a surface roughening method using sandblasting, matting, or the like, or a particle adding method; and providing a reflection layer on the film substrate so that the fine irregularity structure is reflected in the reflection layer. The reflection layer having such a fine irregularity structure in which the fine irregularity structure of the surface is reflected can be formed by a method of providing a metal on the surface of the film substrate by a suitable vapor deposition or plating method such as a vacuum vapor deposition method, an ion-plating method or a sputtering method.

In the liquid-crystal display device according to the present invention, a great part of light incident on the incident side surface is transmitted backward through reflection based on laws of refraction through the upper and lower cell substrates on the basis of thickness proportion of respective layers in the liquid-crystal display panel. While light emitting (leakage) from the surface of the panel is prevented and while total reflection at the interface between the optical path changing sheet 11 having the adjusted refractive index and the adhesive layer 12 is suppressed, the optical path of light incident on the optical path changing slopes A1 of the optical path changing sheet is efficiently changed to the viewing direction, particularly, to the frontal direction. The other part of light is transmitted backward by total reflection and made incident on the optical path changing slopes A1 in the rear portion. The optical path of the other part of light is efficiently changed to the viewing direction. Hence, display excellent in uniformity of brightness on the whole surface of the panel display screen can be achieved. Hence, a transmission type or transmission-reflection double type liquid-crystal display device bright, easy to view and excellent in display quality can be formed because light from the light source can be utilized efficiently.

According to the present invention, optical devices or parts such as an optical path changing sheet, a liquid-crystal cell, a polarizer, a retarder, etc. for forming the liquid-crystal display device may be wholly or partially integrally laminated/fixed onto one another or may be disposed separably. From the point of view of prevention of lowering of contrast based on suppression of surface reflection, etc., it is preferable that such devices or parts are fixed onto one another. A suitable transparent adhesive agent such as a tackifier can be used for the fixing process. The transparent adhesive layer may contain transparent particles as described above so that the transparent adhesive layer can exhibit a diffusing function. The optical devices or parts, particularly visual side optical devices or parts may be formed to have ultraviolet-ray absorbing power by a method of treatment with an ultraviolet-ray absorbent such as a salicylic ester compound, a benzophenone compound, a benzotriazole compound, a cyanoacrylate compound, a nickel complex salt compound, etc.

EXAMPLE 1

An acrylic ultraviolet-curable resin (ARONIX UV-3701 made by TOAGOUSEI Co., Ltd.) was dropped by a dropper so that a mold processed into a predetermined shape in advance was filled with the acrylic ultraviolet-curable resin. A triacetylcellulose (TAC) film (having a saponified surface and having a refractive index of 1.485) 80 µm thick was quietly set on the acrylic ultraviolet-curable resin and then stuck closely to the acrylic ultraviolet-curable resin by a rubber roller so that a surplus of the resin and air bubbles were removed. Then, the acrylic ultraviolet-curable resin was irradiated with ultraviolet rays by a metal halide lamp so that the resin was hardened. Then, the resin was released from the mold and cut into a predetermined size. Thus, an optical path changing sheet having an optical path changing means layer having a refractive index of 1.533 was obtained. An adhesive layer having a refractive index of 1.47 was stuck onto a surface of the optical path changing sheet in which no optical path changing means was provided.

The optical path changing sheet was 40 mm wide and 30 mm deep. The optical path changing sheet had prismatic concave portions disposed continuously at intervals of a pitch of 210 μm and having ridgelines inclined at an angle of 23 degrees with respect to the widthwise direction (FIG. 3c). Each of the prism-like concave portions had an optical path changing slope A1, and a gentle slope A2. The inclination angle of each of the optical path changing slopes A1 varied in a range of from 42.5 to 43 degrees. The inclination angle of each of the gentle slopes A2 varied in a range of from 1.8 to 3.5 degrees. The difference between the inclination angles of adjacent ones of the gentle slopes A2 was not larger than 0.1 degrees. The projected width of each of the optical path changing slopes A1 on the sheet plane was in a range of from 10 to 16 μm. The ratio of the projected area of the gentle slopes on the sheet plane to the projected area of the optical path changing slopes on the sheet plane was not smaller than 12.

Then, a cold-cathode tube was disposed on a side surface of an available normally white transmission type TN liquid-crystal panel. The cold-cathode tube was enclosed in a reflector made of a silver-deposited reflection sheet. Opposite end portions of the reflector were bonded to upper and lower surfaces of the panel so that the cold-cathode tube was fixed. Then, a light diffusing film including a TAC film and a resin-particle-containing adhesive layer provided on the TAC film was bonded to a polarizer on the back side (opposite to the visual side). The aforementioned optical path changing sheet was bonded onto the light diffusing film so that the optical path changing slopes faced the cold-cathode tube. The panel was disposed on a reflection sheet made of a white polyester film so that the optical path changing sheet was positioned on the back side opposite to the visual side. Thus, a transmission type liquid-crystal display device was obtained. Incidentally, the refractive index of the cell substrate near the optical path changing sheet in the liquid-crystal panel was 1.485.

EXAMPLE 2

A transmission type liquid-crystal display device was obtained in the same manner as in Example 1 except that the optical path changing sheet was replaced by an optical path changing sheet having optical path changing means (FIG. 3B) each having an optical path changing slope A1 inclined at an inclination angle of about 42 degrees, a steep slope A2 making a vertical angle of 70 degrees with respect to the optical path changing slope A1, and a flat portion A3 having an area of not smaller than 10 times as large as the total projected area of the optical path changing slope and the steep slope on the sheet plane.

EXAMPLE 3

A transmission type liquid-crystal display device was obtained in the same manner as in Example 1 except that the optical path changing sheet was replaced by an optical path changing sheet (FIGS. 6 and 8) which had optical path changing means (FIG. 3B) each having a length of 80 μm and each having an optical path changing slope A1 inclined at an inclination angle of about 42 degrees and having a projected width of 10 μm on the sheet plane, and a steep slope A2 inclined at an inclination angle of about 55 degrees and in which the direction of the length of the optical path changing slopes A1 was parallel to the incidence side surface and in which the optical path changing means were disposed gradually densely as the optical path changing means went farther from the incidence side surface in the depthwise direction. Incidentally, the area of the flat portions A3 was not smaller than 10 times as large as the total projected area of the optical path changing slopes and the steep slopes on the sheet plane.

EXAMPLE 4

A transmission type liquid-crystal display device was obtained in the same manner as in Example 1 except that the optical path changing sheet was replaced by an optical path changing sheet (FIG. 6) which had optical path changing means (FIG. 3A) each having a length of 80 μm and each having an isosceles triangle of an optical path changing slope A1 inclined at an inclination angle of about 42 degrees and having a projected width of 10 μm on the sheet plane and in which the direction of the length of the optical path changing means was parallel to the incidence side surface and in which the optical path changing means were disposed at random so that the optical path changing means were gradually dense as the optical path changing means went from the incidence side surface to the center portion in the depthwise direction and that cold-cathode tubes were disposed on two opposite side surfaces of the optical path changing sheet. Incidentally, the area of the flat portions A3 was not smaller than 10 times as large as the total projected area of the optical path changing slopes and the steep slopes on the sheet plane.

EXAMPLE 5

A transmission type liquid-crystal display device was obtained in the same manner as in Example 1 except that the optical path changing sheet was replaced by a scattering sheet formed by a sandblasting process. Incidentally, the scattering sheet was disposed so that the rough surface of the scattering sheet was positioned on the back side opposite to the visual side.

EXAMPLE 6

A transmission type liquid-crystal display device was obtained in the same manner as in Example 1 except that the optical path changing sheet was replaced by an optical path changing sheet having optical path changing means (FIG. 3B) each having an optical path changing slope A1 inclined at an inclination angle of about 30 degrees, a steep slope A2 making a vertical angle of 70 degrees with respect to the optical path changing slope A1, and a flat portion A3 having an area of not smaller than 10 times as large as the total projected area of the optical path changing slope and the steep slope on the sheet plane.

EXAMPLE 7

A cold-cathode tube was disposed on a side surface of a 1.2 mm-thick light pipe having an embossed rough surface on the back side opposite to the visual side. The cold-cathode tube was enclosed in a reflector made of a silver-deposited reflection sheet. Opposite end portions of the reflector were bonded to upper and lower surfaces of the light pipe. The light pipe was disposed on a reflection sheet made of a white polyester film. An available normally white transmission type TN liquid-crystal panel was disposed on the light pipe through a light diffusing plate. Thus, a transmission type liquid-crystal display device was obtained.

Evaluation Test

Frontal luminance in the center of the transmission type liquid-crystal display device obtained in each of Examples 1 to 7 was measured by a luminance meter (BM-7 made by TOPCON Corp.) in the condition that the liquid-crystal cell was supplied with no voltage. Results of the measurement were shown in the following Table.

| | Example 1 | Example 2 | Example 3 | Example 4 | Example 5 | Example 6 | Example 7 |
|---|---|---|---|---|---|---|---|
| Frontal Luminance ($cd/m^2$) | 21 | 22 | 21 | 37 | 4 | 11 | 31 |

It is apparent from the Table that excellent frontal luminance was achieved in Examples 1, 2 and 3 compared with Examples 5 and 6. This is because light in Examples 5 and 6 output in a direction reverse to the light source and served as output light hardly contributing to display so that frontal luminance ran short. Particularly in Example 5, output light ran short in all directions. On the other hand, in Example 4, improvement of luminance due to the two-lamp type panel was remarkable. It is apparent that more brightness than that in the side-lighting type light pipe in Example 7 was obtained in Example 4. Incidentally, in the system using the side-lighting type light pipe in Example 7, increase of thickness due to the light pipe was remarkable, so that it was difficult to reduce the thickness.

In Examples 1 to 4, good display quality was obtained because there was no problem on visibility in the condition that a voltage was applied to the liquid-crystal cell. In Example 3, the case where the light diffusing sheet was removed was inferior in visibility but equal in frontal luminance to the case where the light diffusing sheet was provided. It is proved from the above description that a transmission type liquid-crystal display device excellent in display quality can be formed according to the present invention while increase in volume and weight due to the light pipe is avoided so that reduction in thickness and weight is achieved by a sheet method.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A liquid-crystal display device comprising: a transmission type liquid-crystal display panel including a liquid crystal cell; a light source disposed on at least one side surface of said liquid-crystal display panel, wherein light emitted from said light source exclusively enters substrates of said liquid-crystal display panel and layers therebetween; and an optical path changing sheet disposed on a back side, opposite to a visual side, of said liquid-crystal display panel and having optical path changing, slopes by which incident light from said light source is reflected toward said visual side of said liquid-crystal display device.

2. A liquid-crystal display device according to claim 1, wherein said liquid-crystal display panel further includes a polarizer disposed on one or each side of said liquid-crystal cell.

3. A liquid-crystal display device according to claim 2, wherein said liquid-crystal display panel further includes at least one retarder disposed between said liquid-crystal cell and said polarizer.

4. A liquid-crystal display device according to claim 1, wherein said substrates support said liquid-crystal cell, and said substrates are made of an optically isotropic material.

5. A liquid-crystal display device according to claim 4, wherein said optical path changing sheet has optical path changing slopes each inclined at an inclination angle in a range of from 35 to 48 degrees with respect to a sheet plane, said optical path changing sheet is bonded to said liquid-crystal display panel through an adhesive layer so that a slope forming surface of said optical path changing sheet is located on said back side opposite to said visual side of said liquid-crystal display panel, and a refractive index difference is not larger than 0.15 between said optical path changing sheet and one of said substrates nearest to said optical path changing sheet.

6. A liquid-crystal display device according to claim 5, wherein the refractive index difference is not larger than 0.10 between said optical path changing sheet and said nearest substrate, and a refractive, index difference is not larger than 0.15 between said adhesive layer and said nearest substrate.

7. A liquid-crystal display device according to claim 1, wherein said optical path changing sheet includes repetitive prismatic structures having optical path changing slopes facing said light source at an inclination angle of from 35 to 48 degrees with respect to said sheet plane.

8. A liquid-crystal display device according to claim 7, wherein said inclination angle of said optical path changing slopes of said optical path changing sheet facing said light source is in a range of from 38 to 45 degrees with respect to said sheet plane.

9. A liquid-crystal display device according to claim 7, wherein each of said prismatic structures of said optical path changing sheet is constituted by a concave portion shaped like a triangle in section.

10. A liquid-crystal display device according to claim 9, wherein said prismatic concave portions are constituted by continuous grooves extended from one end of said sheet to the other end of said sheet in a ridgeline direction parallel to or inclined to a side surface of said liquid-crystal display panel on which said light source is disposed.

11. A liquid-crystal display device according to claim 7, wherein said prismatic concave portions are constituted by discontinuous grooves each of which has a length of not smaller than five times as large as the depth of said groove and in which a direction of a length of said groove is substantially parallel to a side surface of said liquid-crystal display panel on which said light source is disposed.

12. A liquid-crystal display device according to claim 7, wherein each of said prismatic structures of said optical path changing sheet is constituted by a concave or convex portion shaped like a trapezoid in section and having two or more optical path changing slopes facing said light source.

13. A liquid-crystal display device according to claim 1, further comprising a reflection layer disposed on a back side opposite to a visual side of said optical path changing sheet.

14. A liquid-crystal display device according to claim 13, wherein said reflection layer adheres closely to a surface of said optical path changing sheet on which said optical path changing slopes are formed.

15. A liquid-crystal display device according to claim 1, further including no light-guiding plate.

16. A liquid-crystal display device according to claim 1, wherein said optical path changing sheet has a thickness that is less than 300 $\mu$m.

17. A liquid-crystal display device according to claim 1, wherein said optical path changing sheet has a thickness that is between about 5 μm and about 200 μm.

18. A liquid-crystal display device according to claim 1, wherein said optical path changing sheet has a thickness that is between about 10 μm and about 100 μm.

19. A liquid-crystal display device according to claim 1, wherein said light source is disposed in contact with said at least one side surface of said liquid-crystal display panel.

* * * * *

UNITED STATES PATENT AND TRADEMARK OFFICE
CERTIFICATE OF CORRECTION

PATENT NO. : 6,795,136 B2
DATED : September 21, 2004
INVENTOR(S) : Seiji Umemoto and Toshihiko Ariyoshi It is certified that error appears in the above-identified patent and that said Letters Patent is hereby corrected as shown below:

Column 15,
Line 57, delete "changing, slopes" and insert -- changing slopes --.

Column 16,
Line 20, delete "refractive, index" and insert -- refractive index --.

Signed and Sealed this

Twenty-second Day of February, 2005

JON W. DUDAS
*Director of the United States Patent and Trademark Office*